United States Patent [19]
Myers

[11] 3,990,475
[45] Nov. 9, 1976

[54] LOW NOISE VALVE TRIM
[75] Inventor: Edward B. Myers, Oreland, Pa.
[73] Assignee: Honeywell Inc., Minneapolis, Minn.
[22] Filed: Jan. 8, 1975
[21] Appl. No.: 539,508

[52] U.S. Cl. .......................... 137/625.3; 137/625.38
[51] Int. Cl.² ........................................ F16K 47/06
[58] Field of Search ..................... 137/625.3, 625.38

[56] References Cited
UNITED STATES PATENTS

| | | | |
|---|---|---|---|
| 2,928,424 | 3/1960 | Horton et al. | 137/625.38 |
| 3,428,086 | 2/1969 | Glasgow | 137/625.3 |
| 3,469,591 | 9/1969 | Odendahl | 137/625.3 X |
| 3,780,767 | 12/1973 | Borg | 137/625.3 |
| 3,813,079 | 5/1974 | Baumann | 137/625.37 X |
| 3,821,968 | 7/1974 | Barb | 137/625.3 |

Primary Examiner—Arnold Rosenthal
Attorney, Agent, or Firm—Laurence J. Marhoefer; Lockwood D. Burton; George E. Bodenstein

[57] ABSTRACT

A skirt, containing a number of spaced apart helical grooves along its outer longitudinal surface and an array of spaced apart perforations therein, is attached at one of its ends to one end of a plug of a cage valve. This perforated multi-helical grooved skirt provides a noise attenuating affect on a fluid as it flows through the valve. This skirt construction allows a portion of the fluid to flow through the grooves and across jets of fluid flowing through and between perforations in the wall of the skirt and in the valve cage to thereby create turbulence in the combined fluids. The grooves are formed between lands that have sharp outer edges, which lands continuously clean foreign matter from an inner bore wall portion of the cage as the unitary plug and skirt is moved between an open and closed position.

4 Claims, 4 Drawing Figures

LOW NOISE VALVE TRIM

BACKGROUND OF THE INVENTION

1. Field of the Invention

The invention relates to valves and, more particularly, to an attenuating means to lower the noise level introduced by high pressure gas, steam or a liquid as it passes through a valve.

2. Description of the Prior Art

In attempting to reduce the noise level of valves to low noise levels that meet present day governmental and industrial standards, many different noise attenuating constructions for such valves have been devised. One such valve construction employs a plurality of stacked perforated discs. The flow passages in these discs are so staggered or spaced that the fluid passing therethrough travels in a tortuous path whereby the pressure drop across the valve is increased and its discharge velocity is reduced. Such an arrangement is shown in the K. S. Borg et al U.S. Pat. No. 3,780,767.

Perforated cages and perforated plugs through which the fluid is directed have likewise been utilized heretofore, such as is shown in U.S. Pat. No. 3,821,968.

Since the aforementioned perforated stacked discs and the aforementioned perforated cage and plug arrangements require the fluid passing through the valve to tunnel through many restricted passageways, such construction has a detrimental affect of limiting the velocity at which a fluid can flow through these valves.

Another problem that has heretofore been encountered with stacked disc type valves and the perforated plug-sleeve arrangement of the G. E. Barb U.S. Pat. No. 3,821,968 that contains perforated valve plug parts and an associated perforated cage is that there is a tendency for such valves to become clogged due to foreign matter in the fluid under control adhering to the walls forming the restricted passageways in these valves.

SUMMARY OF THE INVENTION

It is an object of the present invention to provide a valve having improved noise attenuating means.

It is another object of the present invention to provide an improved valve structure, as set forth, which obviates the shortcomings of the prior devices.

It is a further object of the present invention to provide an improved valve structure, as set forth, which effectively attenuates noise without seriously impeding flow rate and which is, in effect, self-cleaning.

In carrying out these and other objects, there has been provided, in accordance with the present invention, a skirt that is formed with a number of spaced apart helical grooves along its outer surface, the skirt being connected at one of its ends to one end of a plug of a cage valve. An array of spaced apart passageways or perforations through the walls of the skirt is located along each groove. The spiral grooves and spaced apart perforations are employed to provide an attenuating effect on a flow of fluid as it passes through the perforations in the skirt and associated passageways in the cage while changes in the rate of flow of this fluid are increased by the opening of the valve. Since the fluid passing along the spaced apart helical portion of the grooves flows across jets of fluid flowing from the inside wall of the skirt, through the perforations herein and through perforations in the cage portion of the valve, the fluid in the helical grooves will thus create a turbulence in the fluid and thereby enhance the noise attenuating effect. This turbulence also provides a self-cleaning effect for the passages in the skirt and cage valve.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Figure 1:
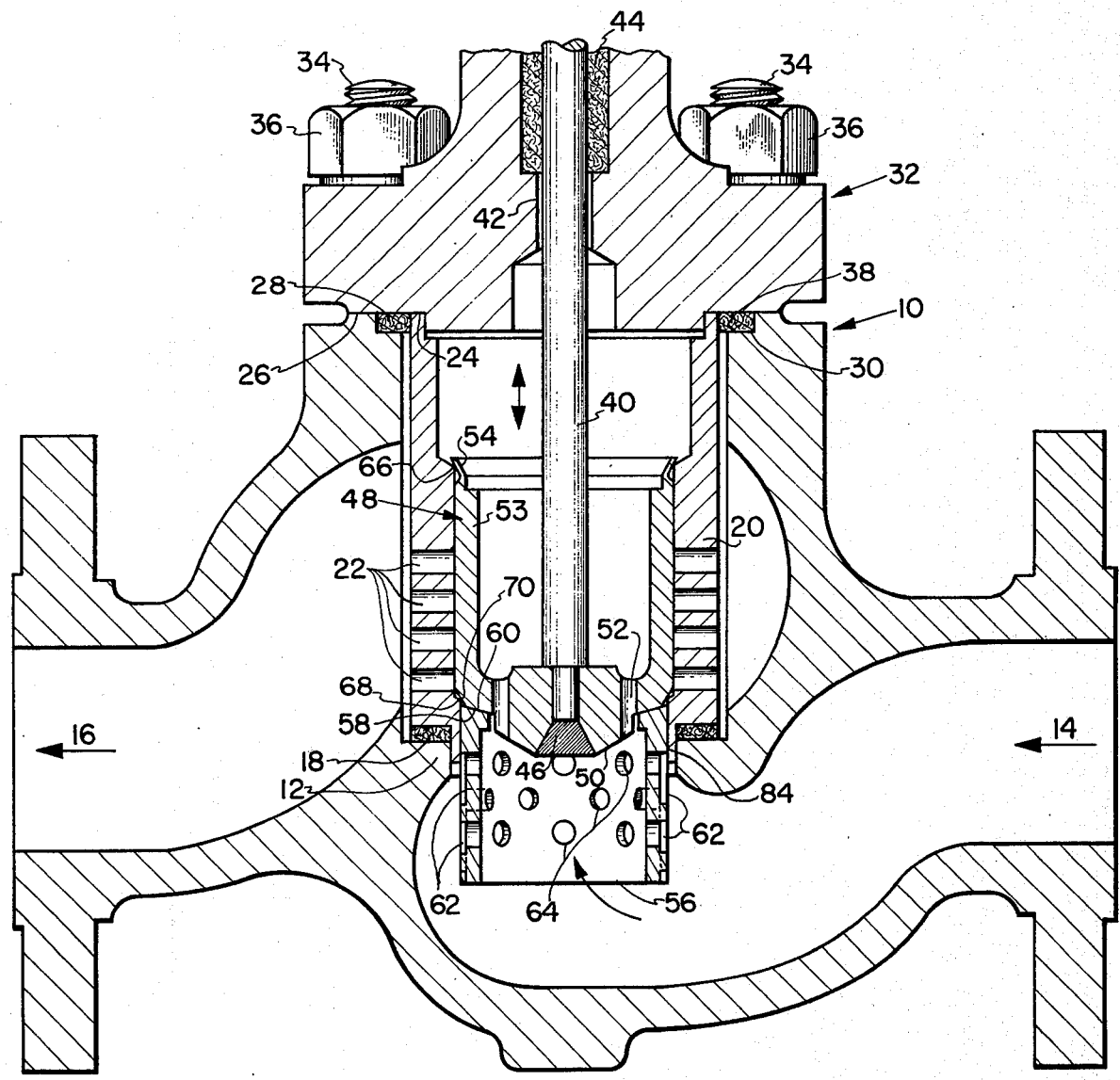
FIG. 1 is a cross-sectional view of an improved cage valve, embodying the present invention, in a closed position.

For an understanding of the preferred embodiment of the invention, reference will be first made to FIG. 1.

The unitary valve body 10 is provided with a shoulder 12 separating the inlet and outlet passageways 14, 16. A seat ring 18 rests on the circular shoulder 12. Positioned concentrically with and directly above the seat 18 is a hollow cylindrical cage 20 having a plurality of openings 22 communicating with the outlet passageway 16.

The upper cylindrical surface or top rim 24 of the cage 20 is co-planar with the upper surface of a shoulder 26 formed on the upper end of the body 10. A ring-shaped gasket 28 rests on the annular top wall portion 30 of the body 10 and between the top rim 24 of the cage 20 and the shoulder 26.

A bonnet 32 is secured to the valve body 10 by a plurality of tap bolt and nut assemblies 34, 36. Two of these tap bolt and nut assemblies 34, 36 are shown fixedly securing the surface 38 of the bonnet 32 against the gasket 28 and against the upper surface of the shoulder 26 formed at the top of the valve body 10.

A stem 40 passes through a cylindrical opening 42 and packing 44 in the bonnet 32. The upper end of the stem 40 is connected to any suitable actuator, not shown, for movement in a vertical direction.

The stem 40 is connected at its lower end 46, as by welding, to a semi-balanced hollow plug 48. The plug 48 includes a conically shaped base portion 50 and a plurality of openings 52 through the base portion 50.

The plug 48 basically includes a rigid cylindrical body 53 bridged at the lower end by the conical base 50. The cylindrical body 53 terminates at the upper end in a flared, frusto-conical resilient seating surface portion 54 as is disclosed in co-pending U.S. Pat. application Ser. No. 460,456, filed Apr. 12, 1974, and now U.S. Pat. No. 3,892,384.

The upper end of a cylindrical skirt 56 is connected, as by welding at 58, to an annular base portion 60 of the plug 48.

Figure 3:
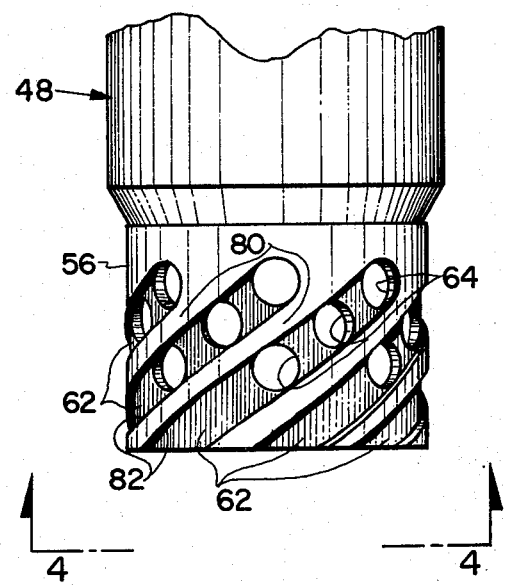
FIG. 3 is an external view of the plug and skirt of the valve shown in FIGS. 1 and 2.
Figure 4:
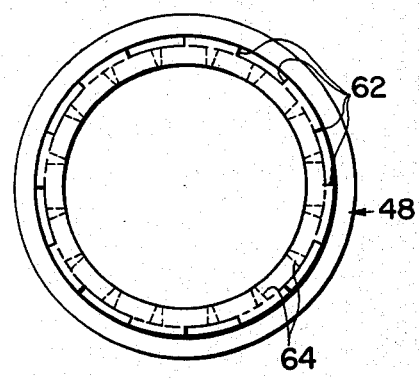
FIG. 4 is a view taken along the lines 4—4 of FIG. 3.

The detail of the skirt 56 as shown in FIGS. 3 and 4 has a number of spaced helical grooves 62 in and extending about its outer surface. Each groove has an array of spaced perforations or passageways 64 extending therethrough.

The upper and lower ends of the cage 20 in FIG. 1 are each provided with a sharp edge which form annular line seating end surfaces 66, 68 associated with seating surfaces 54, 70, respectively, formed on the plug 48.

The cage 20, the plug 48 and the skirt 56 are preferably made of stainless steel. It should, however, be understood that the plug, cage and skirt can be constructed of other materials that have suitable physical characteristics and which can be employed to control the flow and attenuate the noise created by the flow of different types of gases, steam or liquids over a wide temperature and pressure range.

Figure 2:
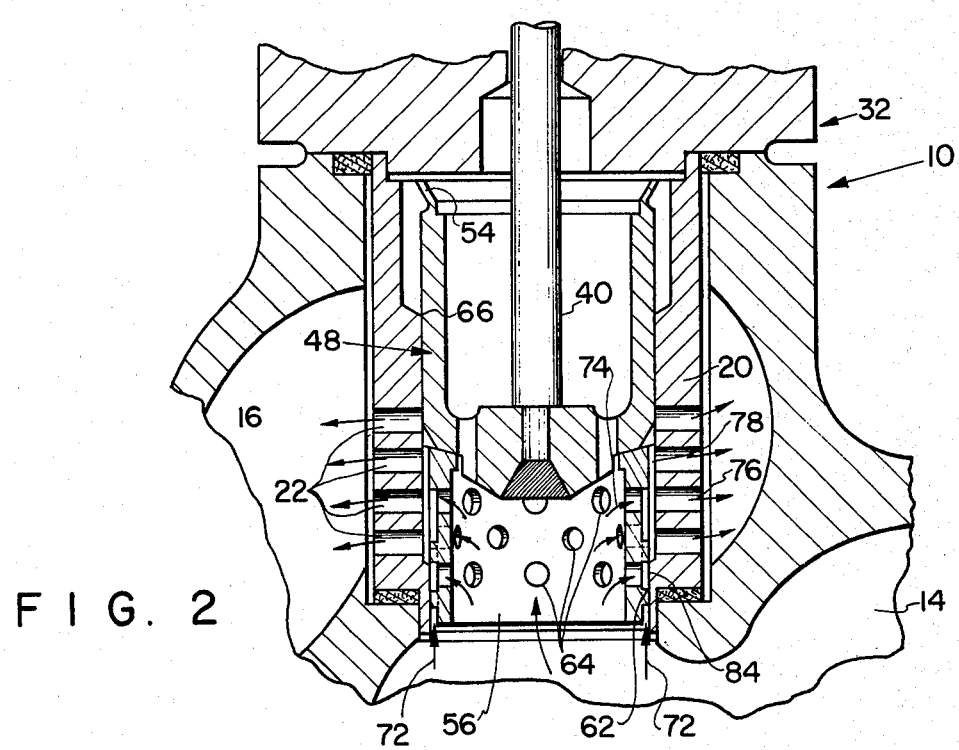
FIG. 2 is a cross-sectional view showing the cage valve of FIG. 1 in an open position.

In FIG. 2, there is illustrated the unseated position of the plug seats 54, 70 when the plug 48 is in a fully open position.

The arrows 72, 72 of FIG. 2 indicate that a first portion of the fluid on the inlet side of the valve is directed to flow in an upward direction through the helical grooves 62. The arrows 74, 76 indicate that a remaining or second major flow portion of the fluid is directed to flow from the perforations 64 in the skirt 56 through the annular chamber 78 and through the passageways 22 in the cage 20 to the outlet side 16 of the valve.

The previously-mentioned grooves 62 in the skirt 56 are formed between lands 80. The outer portions of these lands 80 have sharp edges 82 which are retained in slidable contact with an annular cage bore surface 84.

MODE OF OPERATION

The outer cylindrical surface of the valve plug 48 is arranged for sliding movement along the inner cylindrical surface of the cage 20 by means of the stem 40 and an actuator, not shown, connected to the upper end of the stem 40. When a force is applied to the valve stem 40 to move it and the associated plug 48 in an upward direction, the plug 48 will be moved away from its seated or fully closed position, as shown in FIG. 1, to an unseated position such as the fully opened position shown in FIG. 2.

It should be understood that the plug 48 can also be moved by the aforementioned actuator and stem connection to any desired partially open position intermediate the closed position of FIG. 1 and the fully open position of FIG. 2.

When the valve is in the closed position, as shown in FIG. 1, the fluid on its inlet side 14 is allowed to be applied by way of the openings 52 in the plug 48 to the top and inner wall surfaces of the plug 48. This allows the pressure acting on the top and bottom of the plug to be equalized while the plug is in this closed position so that a minimum amount of force will be required by the actuator to move the plug away from its seated position to its open position.

When the upper and lower seating portions 54, 70 of the plug 48 are in a sealed or seating position, the pressure of the aforementioned inlet fluid cannot be transmitted through the passageways 22 formed in the cage 20.

In this FIG. 1, or closed valve position, the skirt 56 is immersed in the fluid that is being applied to the inlet side 14 of the valve 10. In order to allow the fluid on the inlet side 14 of the valve 10 to pass through its outlet side 16, the plug 48 is moved to a position that is located between its closed FIG. 1 position and its fully open FIG. 2 position. When this takes place, a portion of the fluid on the inlet side 14 inside the skirt 56 will flow under pressure through the perforations 64 in the skirt that are fully or partially open, the grooves 62, the chamber 78 and the perforations 22 in the cage 20 and will then flow into the outlet side 16 of the valve 10.

The inlet fluid in the other remaining perforations 64 flows out of these perforations into and along the grooves 62 into and through the chamber 78 and then out of the passageways 22 in the cage 20.

While portions of the aforementioned fluid on the inlet side 14 of the valve 10 flow in the aforementioned manner through the open or partially open perforations 64 in the skirt 56, the grooves 62, chamber 78 and through the perforations 22 in the cage 20, the pressure of a remaining portion of the fluid on the inlet side 14 of the valve 10 is simultaneously applied in a direction as indicated by the arrows 72, 72 through the lower end of each of the grooves 62.

When the force of the portion of the inlet flowing fluid flowing in the direction of the arrows 72, 72 is brought into contact with the portions of the inlet fluid that is flowing in the direction of the arrows 74, 76, a resulting turbulent fluid condition is created. This turbulent flow condition will tend to attenuate the noise level of the valve. The grooves 62 in the skirt 56 thus keep the noise level of the valve 10 well within the low noise level that is acceptable by industrial and governmental standards.

If the valve is to be operated in a fully open position as shown in FIG. 2, a larger number of passageways 64 and 22 are in alignment with one another than when the plug 48 was in the previously-referred to partially open position. For this reason, the flow rate of fluid flowing through the inlet side 14 to the outlet side 16 of the valve 10 will be at a maximum value when the valve is in this FIG. 2 position.

Increasing amounts of inlet fluid will also pass through the grooves 62 in the skirt 56 as the valve plug 48 is moved between its closed and fully open positions.

Outer sharp edge surfaces 82 are formed on each of the lands 80, between which the grooves 62 are formed in the skirt 56.

The sharp edges 82 provide a means of cleaning the foreign matter from the annular cage bore surface 84 as the skirt is slid therealong.

The embodiments of the invention in which an exclusive property or privilege is claimed are defined as follows:

1. A noise attenuating valve for regulating the flow of a fluid, comprising
   a hollow multi-perforated cage,
   an elongated hollow plug mounted for sliding engagement within said cage,
   a cylindrical skirt connected at one end to one end of said plug and in axial alignment therewith,
   said skirt having a multiplicity of grooves of a helical configuration extending along a longitudinal outer surface thereof, and
   a multiplicity of spaced perforations extending through the wall portions of said skirt containing each of said grooves,
   said perforations in said skirt and cage being positioned to provide passageways for transmitting increasing amounts of a first portion of said flow of fluid under regulation through said valve as said plug is moved from a closed to an open position,
   said grooves in said skirt providing passageways for simultaneously transmitting other portions of said flow of fluid against said first portion of said flow of fluid, thereby introducing turbulence and a noise attenuating effect in said flow of fluid, and the outer circumference of said skirt being spaced inwardly of the inner wall of said cage to thereby form an annular passageway between said skirt and said cage for introducing additional turbulence and an additional noise attenuating effect in said flow of said fluid.

2. The noise attenuating valve as defined in claim 1 wherein the wall forming each of said grooves extends to one end of said skirt.

3. The noise attenuating valve as defined in claim 1 wherein the diameter of said skirt is smaller than the outside diameter of said plug.

4. The noise attenuating valve as defined in claim 1 wherein said cage has an inner bore surface portion, each groove in said skirt has adjacent lands that each form a different side wall portion of its associated groove, and each of said lands has a pair of sharp outer edge surfaces for engaging said bore surface of said cage to continuously clean foreign matter therefrom as said skirt is moved along said bore surface.

* * * * *